G. FLEMING.
BEEHIVE.
APPLICATION FILED JULY 17, 1916.
1,270,507.
Patented June 25, 1918.
2 SHEETS—SHEET 1.
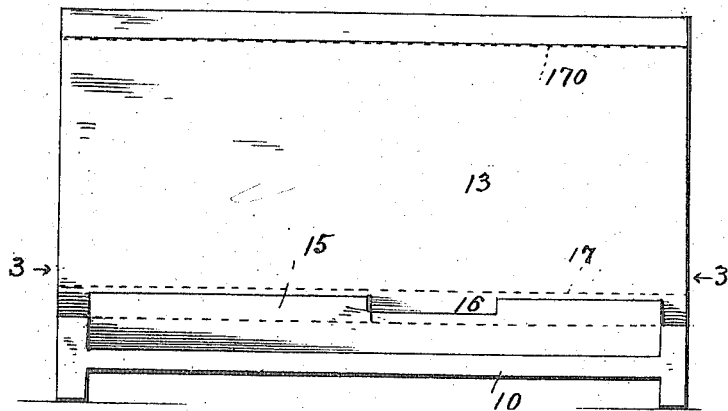
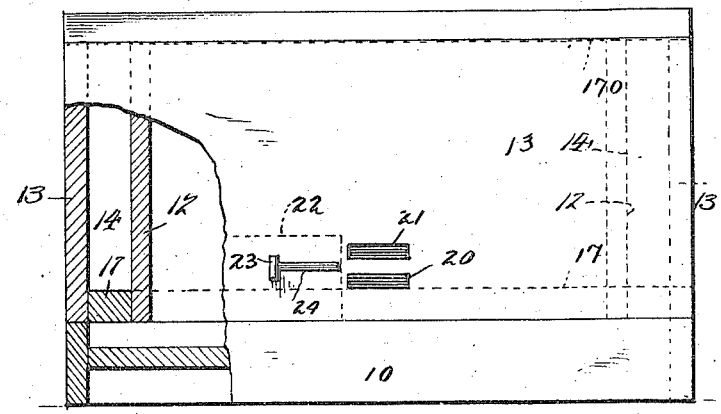
Inventor
George Fleming
By Chas J Williamson
Attorney

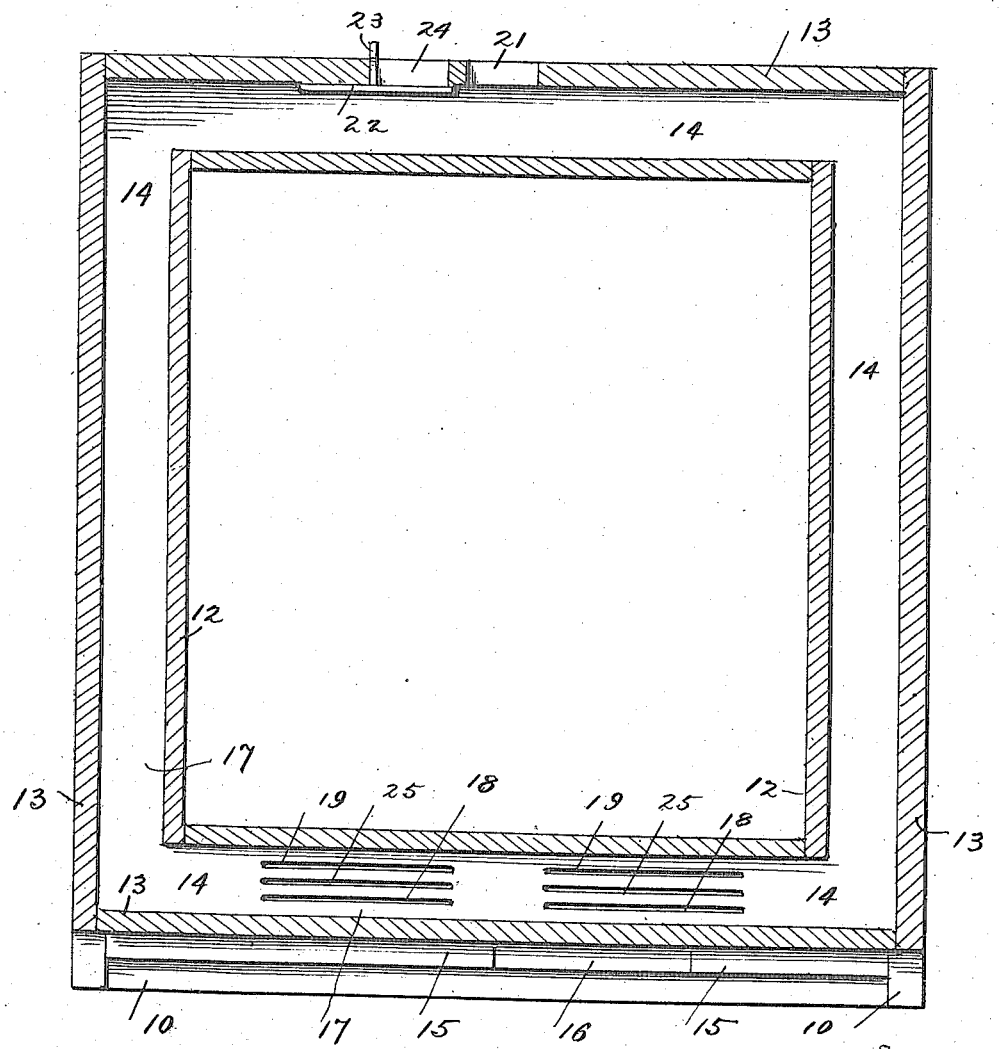

UNITED STATES PATENT OFFICE.

GEORGE FLEMING, OF NELSON, BRITISH COLUMBIA, CANADA.

BEEHIVE.

1,270,507.　　　　　Specification of Letters Patent.　　Patented June 25, 1918.

Application filed July 17, 1916.　Serial No. 109,867.

*To all whom it may concern:*

Be it known that I, GEORGE FLEMING, a subject of the King of Great Britain, and residing at Nelson, British Columbia, Canada, have invented a certain new and useful Improvement in Beehives, and do hereby declare that the following is a full, clear, and exact description thereof.

The object of my invention is to provide a construction of bee hive by which when the temperature is low, as for example, is anywhere from freezing point to fifty degrees below, as is the case in some parts of Canada, and when there is a high wind, the bees within the hive will be protected from the wind and their own heat used to warm air entering the hive, the construction being such that a circulation of air within the hive is secured, and with this object in view and the achievement thereof by a construction which will be simple and practical, my invention consists in the beehive construction constructed substantially as hereinafter specified and claimed, and one embodiment of which invention is shown in the accompanying drawings in which—

Figure 1 is a front elevation of a hive embodying my invention;

Fig. 2 is a rear elevation thereof;

Fig. 3 is a horizontal section on the line 3—3 of Fig. 1 on an enlarged scale.

Referring to the drawings, 10 designates a bottom board which, as is common, is composed of side bars and a floor lying below the plane of the tops of the side bars, and upon the latter rests the hive body, which, as is best shown in Fig. 3, is double walled, that is to say, it has an inner wall 12 and an outer wall 13 that are parallel with each other, and provide a chamber 14 which extends all around the hive on all four sides. While the bottom board has a rear cross bar, it has no front cross bar so as to provide an entrance opening beneath the bottom of the hive body at the front and the top of the bottom floor, which entrance opening may be closed when desired by an entrance block 15, that reaches between the two side bars and overlaps the lower portion of the front wall of the hive body, a notch 16 being provided in one edge, which when placed lowermost affords a contracted bee passage. In the space between the two hive walls and at the bottom of the hive body, there is a board 17 that keeps the double walls in relative position, and closes the bottom of the chamber which they provide. In the board 17 at the front of the hive and toward the outer wall, I cut a slot 18, and directly in rear of the slot 18 I cut a similar second slot 19 which is nearer the inner wall, and hence, being nearer the bees within the hive, (which is inside the inner wall) the temperature is higher so that the air warmed by the bodies of the bees will pass forward below the hive body until it reaches the slot 19 and will then pass up through the latter into the chamber formed by the double wall, and the colder air will descend through the slot 18 from said chamber. In the rear wall of the hive there is a cold air inlet, or slot 20, just above the board which closes the bottom of the chamber, and above the cold air inlet in the rear wall is a warm air outlet 21. It will thus be seen that cold air will enter through the opening 20 into the chamber between the double walls and flow in a current next to the outer wall of the hive around to the slot 18, and will pass downward therethrough into the space between the hive body and the bottom board (it being understood that the entrance block closes the entrance opening into the hive) and the warm air rising through the slot 19 will flow in a current adjacent the inner wall of the hive and make its exit through the warm air outlet 21, so that there will thus be two streams, or currents of air flowing in opposite directions through the chamber between the two hive walls, and in contact with each other, with the result that the cold incoming air will be warmed by the heated out-flowing air before the incoming fresh air reaches the bees in the hive. To regulate the size of the cold air inlet 20, and the warm air outlet 21, a slide, or damper 22 is provided which has a handle, or knob 23 passing through a slot 24 in the back wall of the hive, by which it may be slid to cover, or uncover the said openings 20 and 21 to the desired degree.

Of course, the chamber formed between the outer and inner walls of the hive is closed at the top, and for this purpose a board 170 similar to the board 17 at the bottom, is employed, excepting that the top board has no slots corresponding with the slots 18 and 19.

Preferably between the two slots 18 and 19, I place a third similar slot 25 in order to assure ample air passages, or channels, since each slot must be narrower than a bee space in order to prevent the passage of bees through the slots. The currents of warm and cold air will distribute themselves in passing through the middle slot, so that the warm air will pass up through the central portion thereof, while the cold air will pass downward between the current of warm air and the ends of the slot.

Having thus described my invention what I claim is—

1. A hive body comprising a chamber between spaced inner and outer walls, said chamber being closed at its bottom and said bottom closure being provided with a plurality of vertically extending air passages situated between said inner and outer walls, and the exterior casing of the hive body being provided with vertically spaced openings.

2. The combination of a bottom board, a hive body resting thereon, the bottom board within its sides being spaced below the hive body, and said hive body comprising a chamber between spaced inner and outer walls, said chamber being closed at its bottom and said bottom closure being provided with a plurality of vertically extending air passages situated between said inner and outer walls, and the exterior casing of the hive body being provided with vertically spaced openings.

In testimony that I claim the foregoing I have hereunto set my hand.

GEORGE FLEMING.

Copies of this patent may be obtained for five cents each, by addressing the "Commissioner of Patents, Washington, D. C."